Figure 1:
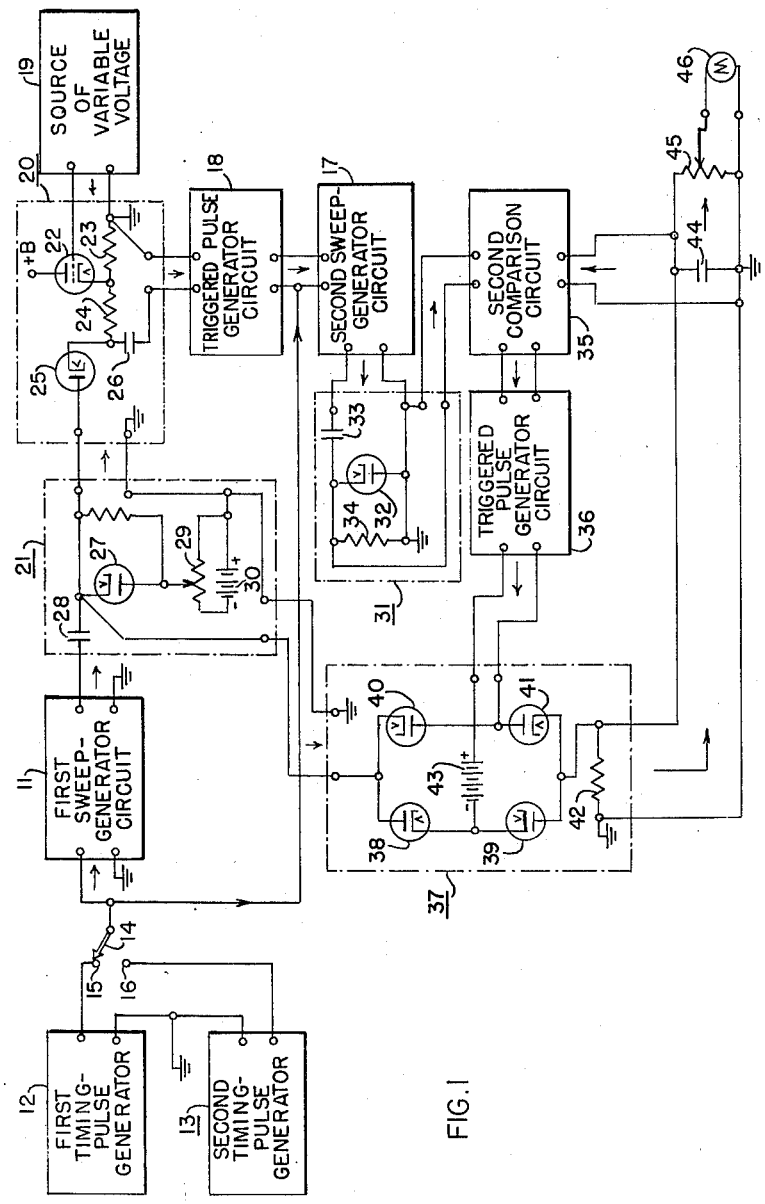

March 9, 1954  C. J. HIRSCH  2,671,608
ELECTRICAL COMPUTER
Filed Oct. 5, 1949  3 Sheets-Sheet 1

INVENTOR.
CHARLES J. HIRSCH
BY Laurence B. Dodds
ATTORNEY

March 9, 1954  C. J. HIRSCH  2,671,608
ELECTRICAL COMPUTER
Filed Oct. 5, 1949  3 Sheets-Sheet 2

*INVENTOR.*
CHARLES J. HIRSCH
BY *Lawrence B. Dodds*
ATTORNEY

March 9, 1954  C. J. HIRSCH  2,671,608
ELECTRICAL COMPUTER
Filed Oct. 5, 1949  3 Sheets—Sheet 3

INVENTOR.
CHARLES J. HIRSCH
BY Laurence B. Dodds
ATTORNEY

Patented Mar. 9, 1954

2,671,608

UNITED STATES PATENT OFFICE 2,671,608

ELECTRICAL COMPUTER

Charles J. Hirsch, Douglaston, N. Y., assignor to Hazeltine Research, Inc., Chicago, Ill., a corporation of Illinois Application October 5, 1949, Serial No. 119,637

17 Claims. (Cl. 235—61)

General

This invention relates to electrical computers for solving equations involving known and unknown parameters. Such computers are particularly suited to the solution of equations involving the operations of integration and differentiation. The subject matter of this application is related to that of applicant's copending application, Serial No. 12,633, filed March 2, 1948, entitled "Electrical Computer" and assigned to the same assignee as the present invention.

One general type of prior computer, which may be referred to as a digital computer, includes relay machines, punch-card machines, and adding and multiplying machines utilizing either mechanical or electrical counting devices. Conventional computers of this type can handle numerical data after the problem has been reduced to a numerical routine susceptible to solutions by digital methods often requiring extensive programing of the operation of the machine. These computers are inherently capable of very high accuracies, the accuracy usually being limited only by the number of places to which a computation is carried out, but the machine may have to perform a very extensive counting operation to solve even a simple algebraic expression. Conventional computers of this type tend to be bulky and cumbersome in operation, particularly when the problem is at all complex, as in the case of integration and differentiation.

Another type of prior computer may be classified generally as a continuously variable computer. Computers of this type deal with quantities by continuous correlation with mechanical displacements or electrical effects. Tachometer instruments come under this classification. These computers are known in the trade as analogue computers. The electronic analogue computers use techniques which are similar to those conventionally used in the field of communications whereas the digital computer uses techniques similar to those used in the field of pulse-modulation systems. Problems of integration and differentiation are solved by using properly proportioned resistor-condenser networks operated in a continuous manner to produce voltages representative of the integrated or differentiated function. Usually such operations may be performed only with respect to time, the resistor-condenser networks depending on a time base.

Compared with digital computers, the analogue computers usually have the advantage of high speed and facility of setting up the computer to solve a given problem, but have the disadvantage that their accuracy tends to be lower. Usually analogue computers are more suitable for small scale problems that do not justify extensive programing, to provide an approximate answer to such problems. Simple analogue computers, capable of performing the operations of integration and differentiation, are also very limited in the parameter values which may be used. The major limitation on analogue integration and differentiation computers is the fact that these computers can be used to solve only a very restricted form of problem in which time must be used as the independent variable of the equation.

It is an object of the present invention, therefore, to provide a new and improved electrical computer which avoids one or more of the limitations and disadvantages of prior computers.

It is another object of the invention to provide a new and improved electrical computer capable of solving equations involving operations of integration or differentiation.

It is a further object of the invention to provide a new and improved electrical computer which does not require mechanical moving parts, is compact and light in weight, yet is capable of making computations at high speeds.

It is a still further object of the invention to provide a new and improved electrical computer capable of continuously and rapidly calculating a problem involving parameters subject to changes.

It is still another object of the invention to provide a new and improved electrical computer for performing mathematical operations in which all of the independent and dependent variables are represented by voltages referred to a convenient reference voltage.

In accordance with the invention, an electrical computer for solving equations involving known and unknown parameters, at least some of which are variable, comprises a first electrical reference circuit having circuit elements with resistance and reactance values so proportioned as to develop a first electrical effect varying as a predetermined time function, a value of this effect at some time representing a value of one of the variable parameters. The computer includes a source of potential having a value representative of one of the parameters and means for utilizing the potential of the source and the first effect at the aforesaid some time to develop a control effect. The computer includes a second electrical reference circuit having circuit elements with resistance and reactance values so proportioned as to develop a second electrical effect varying as a predetermined time function, a value of the second effect at some time representing a value of a predetermined parameter. The computer also includes means responsive to the aforesaid control effect and second effect at the time the value of the second effect represents the value of the predetermined parameter for selecting another value of the first effect. In addition, the computer has means for storing the other value of the first effect at the last-mentioned time to establish another value of the predetermined parameter, and means for utilizing the values of said predetermined parameter.

For a better understanding of the present invention, together with other and further objects thereof, reference is had to the following description taken in connection with the accompanying drawings, and its scope will be pointed out in the appended claims.

Figure 2:
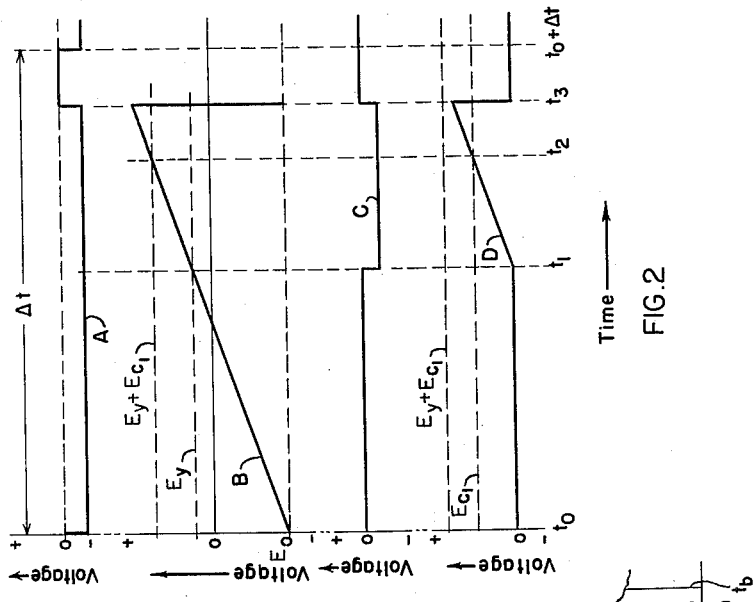
Figure 3:
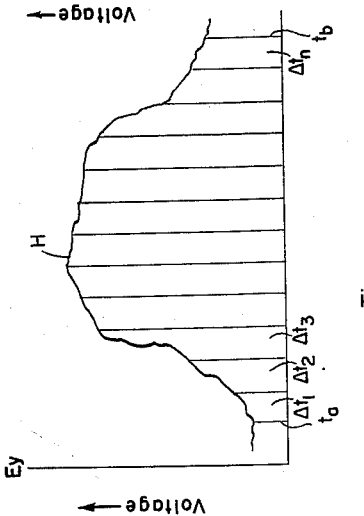
Figure 1A:
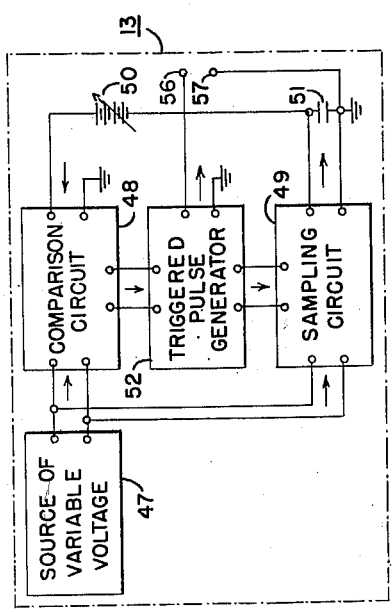
Figure 5:
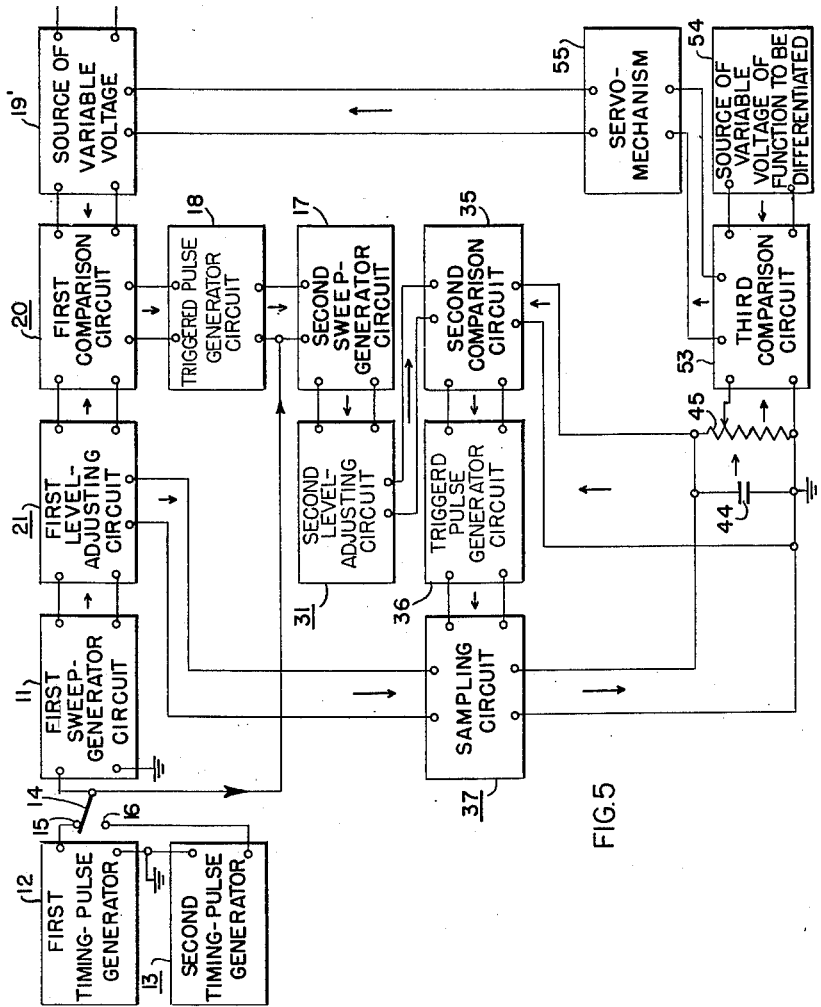
Figure 4:
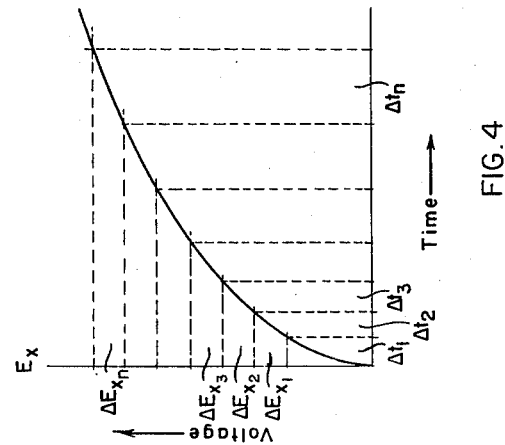

Referring now to the drawings, Fig. 1 is a circuit diagram, partly schematic, of an electrical computer embodying the present invention in a particular form; Fig. 1a is a circuit diagram partly schematic of a modified form of a portion of the computer represented in Fig. 1; Figs. 2 and 3 are graphs useful in explaining the operation of the Fig. 1 arrangement; Fig. 4 is a graph useful in explaining the operation of the Fig. 1a arrangement; and Fig. 5 is a circuit diagram, partly schematic, of another embodiment of the invention.

*Description of computer capable of integrating with respect to time*

Referring to Fig. 1 of the drawings, there is shown a circuit diagram of an electrical computer capable of solving equations involving known and unknown parameters, including equations involving the operations of integration. The computer comprises a plurality of circuits in the form of sweep generator circuits, each effective upon energization to produce a measurable effect having a value which is a predetermined function of time, the known and unknown parameters being represented by values assumed by the time functions of these effects at related times. One of these circuits is a first electrical reference circuit or sweep-signal generator circuit 11. A circuit of this type is disclosed in "Principles of Radar" published by the McGraw-Hill Publishing Company, New York, New York (second edition, 1946) at pages 3-20 and in Fig. 10. This circuit is effective to develop an electrical effect or voltage varying as a predetermined, substantially linear function of time, specifically a voltage wave having an increasing voltage characteristic, for example, a saw-tooth voltage wave, the value of which at some time represents a value of a variable parameter. A first timing-pulse generator 12 and a second timing-pulse generator 13, selectably connected to the control or input circuit of the generator 11 through a switch blade 14 and switch elements 15 and 16, comprise a means for repeatedly energizing the reference circuit 11. The first timing-pulse generator 12 may be of a conventional blocking oscillator type producing periodic energizing pulses. The second timing-pulse generator 13 produces aperiodic energizing pulses of a particular type to be described hereinafter.

The computer also includes means for comparing the instantaneous value of a variable parameter related to the equation to be solved with the value of the first effect at a given time. This means comprises a source of variable voltage 19, representing the value of the variable parameter related to the equation to be solved, and a comparison circuit 20. Unit 19 also comprises a source of variable voltage representing the instantaneous value of a parameter to be integrated. Additionally the computer includes means such as a comparison circuit 20 for utilizing the potential in the unit 19 and the effect developed by the circuit 11 at some time to develop a control effect. Comparison circuit 20 is coupled between the source of variable voltage 19 and across a first level-adjusting circuit 21 to the output terminals of the first sweep-generator circuit 11.

Source of variable voltage 19, the values of the voltages developed therein being representative of the values of a variable parameter, may comprise any of a number of well-known types of mechanical or electrical arrangements. One simple arrangement would comprise a device for tracing the outline of a curve representing the variations of the variable parameter and a simple potentiometer and battery circuit for converting such variations into varying unidirectional voltages.

The comparison circuit 20 includes a tube 22 having a cathode load resistor 23 and a control electrode which are coupled to the source of variable voltage 19. The anode of the tube 20 is connected to a source of potential +B. The cathode of the tube 22 is coupled through a resistor 24 to the cathode of a diode rectifier device 25, the anode of the latter being connected to the level-adjusting circuit 21. The cathode of the diode 25 is coupled through a condenser 26 to the control terminals of a triggered pulse generator circuit 18. The triggered pulse generator 18 may be a conventional blocking oscillator so that a detailed description thereof is unnecessary.

The level-adjusting circuit 21 includes a diode rectifier device 27, the cathode of which is directly coupled to the anode of the diode 25 and is also coupled through a condenser 28 to the output terminals of the first sweep-generator circuit 11. The anode of diode 27 is adjustably coupled by means of a potentiometer 29 to a source of negative potential represented by a battery 30, the battery being connected across the potentiometer 29 with its positive terminal grounded.

The computer also includes a second electrical reference circuit comprising a second sweep-generator circuit 17 similar to circuit 11. This circuit has circuit elements with resistance and reactance values so proportioned as upon energization thereof controlled by a value of the first effect, at a time related to the time of the energization of the first reference circuit 11, that it develops another voltage or effect varying as a predetermined time function, specifically a linear wave having an increasing voltage characteristic, for example a saw-tooth wave. Generator circuit 17 has input terminals connected to output terminals of the generator 18. The input terminals of unit 17 are also connected to the output terminals of generator 12 through the switch element 15 and the switch blade 14. In addition, the output terminals of generator circuit 17 are connected to a level-adjusting circuit 31 including a rectifier device comprising a diode 32. The cathode of the diode 32 is connected to the generator 17 through a coupling condenser 33. The anode of tube 32 is connected to ground and is also connected to the cathode thereof through a resistor 34.

The computer arrangement also includes means responsive, after each of the repeated energizations, to the first and second effects at the time the value of the second effect represents the value of the predetermined parameter for selecting another value of the first effect. This means comprises a second comparison circuit 35, a level-adjusting circuit 31, a triggered pulse generator circuit 36 and a sampling circuit 37. Circuit 35 is coupled to the output terminals of generator circuit 17 through the level-adjusting circuit 31. Triggered pulse generator circuit 36 is coupled to the output terminals of the second comparison circuit 35 and the sampling circuit 37 is coupled to the triggered pulse generator circuit 36 and to the first sweep-generating circuit 11 through level-adjusting circuit 21. The second comparison circuit 35 is similar in construction and operation to the first-mentioned comparison circuit 20. Triggered pulse generator circuit 36 is similar in construction and operation to triggered pulse generator circuit 18.

The sampling circuit 37 is of the bridge-rectifier type and comprises four diode rectifiers 38, 39, 40 and 41 arranged in a conventional bridge-rectifier circuit. One pair of diagonally arranged terminals of this bridge circuit are connected between the output terminals of generator circuit 11, through circuit 21, and a grounded resistor 42. The other pair of diagonally arranged terminals of the bridge circuit are connected to an actuating circuit comprising the triggered pulse generator circuit 36 through a source of bias potential such as a battery 43.

The electrical computer arrangement also comprises means for storing or recording the other value of the first effect at the time the value of the second effect represents the value of the predetermined parameter, to establish another value of the predetermined parameter. This means comprises a condenser 44 connected in parallel with the resistor 42. This condenser is also connected to a pair of input terminals of the second comparison circuit 35 to provide a source of predetermined parameter voltage for the comparison circuit.

Means for utilizing the values of the predetermined parameter which are recorded or stored in the condenser 44 are also provided by a high impedance potentiometer 45 and a meter 46. The potentiometer is connected in parallel with the condenser 44 and the meter is connected to the adjustable tap of the potentiometer. Potentiometer 45 also comprises means for multiplying the values of the predetermined parameter by a constant determined by the period of the repeated energizations of the generator 11 to obtain the value of the integral of a function to be integrated.

*Operation of computer capable of integrating with respect to time*

The operation of the computer previously described will now be explained with reference to the curves of Fig. 2. In order for the computer to operate as described hereafter, switch blade 14 is positioned in contact with switch element 15. The first timing-pulse generator 12 operates in a conventional manner to generate a negative pulse, represented by curve A of Fig. 2 which energizes or initiates the first sweep-generator circuit 11 into generating a saw-tooth wave and which conditions the second sweep-generator circuit 17 to generate a similar saw-tooth wave at a later time. In the computer described, such a pulse will repeat at regular intervals $\Delta t$, the time of initiation of each pulse being identified as time $t_0$. The level-adjusting circuit 21, due to the well-known clamping action of the diode 27 and the negative bias with respect to ground on the anode of the diode produced by the potentiometer 29, maintains the origin of the saw-tooth wave, as represented by curve B of Fig. 2, at a voltage $E_0$ which is negative with respect to ground. Diode 27 conducts for voltages on the cathode thereof which are more negative than $E_0$ and is open circuited for all voltages more positive than $E_0$.

Source of variable voltage 19 applies a variable unidirectional voltage $E_y$ to the control electrode of tube 22. The triode 22, operating as a cathode-follower amplifier, develops a voltage equal to $E_y$ across the load resistor 23. As the saw-tooth wave is being generated in generator 11 and across level-adjusting circuit 21, a difference voltage appears across the series combination of the resistor 24 and diode 25. When the voltage across the level-adjusting circuit 21 reaches the value of the voltage $E_y$ appearing across resistor 23, the diode 25 conducts and develops across the resistor 24 a pulse of voltage having negative polarity (curve not shown). This occurs at time $t_1$. The latter pulse is applied through condenser 26 to pulse generator circuit 18 initiating therein another negative pulse represented by curve C of Fig. 2. The leading edge of the pulse represented by curve C initiates the generation of a saw-tooth wave by the second sweep-generator circuit 17. Level-adjusting circuit 31 provides a zero reference voltage for the second sweep-generator circuit 17 so that the saw-tooth wave generated therein will initiate from zero potential. This second saw-tooth wave represented by curve D of Fig. 2, has the same slope as that of the saw-tooth wave represented by curve B but starts from zero potential at time $t_1$.

In the solution of some mathematical problems, a potential may initially be present across condenser 44 at time $t_1$. For simplicity of explanation, it will be assumed for the purpose of the example to be described that such a potential does exist across condenser 44 at the time the saw-tooth wave represented by curve D of Fig. 2 is being generated.

In a manner similar to the application to the first comparison circuit 20 of the saw-tooth wave of the first sweep-generator circuit 11, the potential developed by the saw-tooth wave represented by curve D of Fig. 2 is applied to the second comparison circuit 35. In a manner similar to the application of the potential in source 19 to comparison circuit 20, the potential present across condenser 44 is also applied to the second comparison circuit 35. Similar to comparison circuit 20, a pulse is generated in the comparison circuit 35 when the potential of the saw-tooth wave of generator circuit 17 becomes equal to the potential $E_{c_1}$ present across condenser 44 at times $t_2$, thereby triggering pulse generator circuit 36. Due to the circuit constants of generator 36, this generator is activated only for a sufficiently long period of time to permit sampling circuit 37 to function.

The pulse from the generator 36 is applied to the sampling circuit 37 with proper polarity and magnitude to overcome the bias voltage developed by battery 43. Accordingly, the bridge circuit including tubes 38, 39, 40 and 41 is actuated and rendered conductive for the duration of the applied pulse with the result that the voltage existing across the level-adjusting circuit 21 at time $t_2$, as represented by curve B of Fig. 2, appears across resistor 42 and therefore across condenser 44. The voltage present across level-adjusting circuit 21 at this time $t_2$ is equal to the voltage $E_y$ present at time $t_1$ plus the voltage $E_{c_1}$ present across level-adjusting circuit 31 at time $t_2$. This is so because the saw-tooth waves generated in circuits 11 and 17 have the same slopes and therefore the rate of increase of voltage in each of the saw-tooth circuits is the same so that the increment of voltage developed in each of the circuits during the time interval from $t_1$ to $t_2$ is the same. At time $t_3$ timing-pulse generator 12 ceases generating the negative pulse represented by curve A of Fig. 2 and sweep-generators 11 and 17 each revert to an inactive status, ready to be reactivated to perform another cycle of operation at time $t_0 + \Delta t$.

The voltage present across the condenser 44 also appears across potentiometer 45. The desired proportion of the voltage across potentiometer 45 is then selected by the adjustment of the variable tap thereon and used in meter 46 to present a desired indication.

The manner in which the Fig. 1 arrangement is utilized to perform computations will be more fully apparent from the following mathematical analysis of its operation as explained with reference to the curve of Fig. 3.

If it is desired to have the computer solve the following operation $$E_z \int_{t_a}^{t_b} E_y dt \qquad (1)$$

where $$E_y = f(t)$$

or $$E_y = \frac{dE_z}{dt}$$

The solution of the equation may be approximated by $$E_z = (\Delta t) \sum_{t_a}^{t_b} E_y \qquad (2)$$

This approximation may be made as accurate as is desired by making $\Delta t$ as small as possible, having it approach zero as in the conventional type of integration operation. Therefore, if a computer can be arranged to measure and record a value of $E_y$ for every $\Delta t$ between the limits $t_a$ and $t_b$ and then have these recorded values of $E_y$ multiplied by the value of $\Delta t$, a very close approximation of the value of the variable $E_z$ between the selected limits may be obtained. Thus in Fig. 3, wherein many areas under the curve H have the same widths $\Delta t_1$, $\Delta t_2$, ... $\Delta t_n$ and heights varying as $E_y$, if the area of each sector having a width $\Delta t$ is determined and all of the areas thereby determined added together, the area under the curve H between the limits $t_a$ and $t_b$ can be determined. Another manner of obtaining the solution of the same problem would be to measure the average $E_y$ for each sector having a width $\Delta t$, add all of the $E_y$ together and then multiply this result by $\Delta t$. The computer described above operates in the latter manner.

In the operation of the computer represented by Fig. 1 in solving an integration of the type presented by Equation 1, it is manifest that the values $E_y$ and $\Delta t$ become the known variables of the equation, values of which can be represented by voltages or the position of mechanical linkages. Thus the source of variable voltage 19 of Fig. 1 may represent the source of variable voltage $E_y$, providing instantaneous values of $E_y$, the positioning of the tap of potentiometer 45 may be determined by the value of $\Delta t$ and one cycle of operation of the computer represented by Fig. 1 may be made to be equal in time to $\Delta t$. Therefore, a value of $E_y$ for each $\Delta t$ may be determined. In addition, by the operation of the sampling circuit 37 and the storing of voltages in condenser 44, the sum of all of the selected $E_y$ for all of the $\Delta t$ between $t_a$ and $t_b$ may be recorded in condenser 44. Potentiometer 45 may then be utilized as a multiplication device to multiply the sums of the $E_y$ present across condenser 44 by the variable $\Delta t$ thereby providing across meter 46 a voltage which represents the value of the integral of $E_y$ with respect to time between $t_a$ and $t_b$ and which is therefore equal to the value of $E_z$ over the same limits.

The operation of summing the numerous $E_y$ may be readily understood by referring to the curves of Fig. 2. Therein it is shown that each cycle of operation occupies a time $\Delta t$, producing a pulse as represented by curve A. The voltage represented by curve B, generated by generator circuit 11 at time $t_1$ becomes equal to the voltage representing variable $E_y$ at time $t_1$. At that time a new saw-tooth wave is generated as represented by curve D, the saw-tooth wave represented by curve B continuing to be generated until time $t_3$. The voltage present across condenser 44 represents the summation of previous $E_y$ voltages. If there have been no previous $E_y$ voltages stored therein, then, since there is no voltage across condenser 44, sampling circuit 37 is immediately triggered and the voltage equal to $E_y$ present across level-adjusting circuit 21 is immediately developed across resistor 42 and recorded in condenser 44. After the first $E_y$ voltage is recorded in condenser 44, each successive cycle of operation of the computer will utilize that voltage so that the new value of $E_y$ as found during each cycle of operation will be added to the previous values recorded therein. The addition of each value of $E_y$ to the previous values of $E_y$ and the recording of these values across condenser 44 is performed in the manner previously described.

Having recorded in condenser 44 the summation of the average values of $E_y$ for each sector of $\Delta t$ as shown in Fig. 3, it becomes necessary to multiply these values by $\Delta t$. Potentiometer 45 by proper adjustment of the adjustable arm thereof performs this operation of multiplication in a conventional manner and Equation 2 is solved to provide a value for $E_z$ across meter 46.

Description of computer capable of integrating with respect to variables other than time In the first explanation of the operation of the described computer, the solution of an equation of the form of Equation 1 was described. The integral of $E_y$ with respect to time between the selected limits was obtained. It sometimes becomes desirable to perform an operation of integration with respect to a variable other than time. For instance, it might be desired to perform an integration of the type.

$$E_z \int_{X_a}^{X_b} E_y d(E_x) \qquad (3)$$

where $$E_y = f(t) \text{ and } E_x = \phi(t)$$

An operation of this type can be carried out by means of a computer of the type described in connection with Fig. 1 but, since the integration is no longer with respect to time but rather is with respect to a variable $E_x$, voltages representative of periodic time intervals may not be used to control the sweep-generator circuits 11, 17. However, voltages representative of aperiodic time intervals proportional to equal increments of voltage determined by the values of $E_x$ are employed, the latter parameter being one component of the equation to be solved. Therefore, a timing-pulse generator of the type of unit 13 of Fig. 1 is employed in conjunction with the other units described with reference to Fig. 1, timing-pulse generator 12 being disconnected by means of switch arm 14.

As represented by the embodiment of Fig. 1a, the second timing-pulse generator 13 comprises a source of variable potential 47, providing the regularly spaced pulses which correspond to one component of the equation to be solved, connected to a comparison circuit 48 and across one pair of diagonally arranged terminals of a sampling circuit 49. The circuit components of the comparison circuit 48 and the sampling circuit 49 are similar to those described for similar units 20 and 37 in the Fig. 1 embodiment. The arrangement of the circuit of the source of variable potential $E_x$, unit 47, is similar to the arrangement described with reference to the source of variable potential $E_y$, unit 19. A source of potential comprising a battery 50 in series with a condenser 51 is also coupled to the comparison circuit, battery 50 being connected between one terminal of circuit 48 and one side of condenser 51. Condenser 51 is also connected across the output terminals of sampling circuit 49. The output terminals of the comparison circuit 48 are coupled through a triggered pulse generator 52, which may be of the type described in the Fig. 1 embodiment, across one pair of diagonally arranged terminals of sampling circuit 49 and to the output terminals 56 and 57 of generator 13.

*Operation of computer capable of integrating with respect to variables other than time*

The operation of the second timing-pulse generator 13 in producing aperiodic timing pulses related to equal increments corresponding to one component of the equation to be solved will now be described with reference to Fig. 4. Fig. 4 represents the variation of variable $E_x$ with respect to time, the ordinate being plotted in terms of voltage $E_x$ and the abscissa in terms of time. Equal increments which correspond to one component of the equation to be solved are shown as $\Delta E_x$ being incremental values of $E_x$. It is desired to convert these increments $\Delta E_x$ into increments of time $\Delta t$ which are related thereto. The voltage setting of battery 50 determines the value of voltage increments $\Delta E_x$. As the regularly spaced voltages representing $\Delta E_x$ are developed in the source of variable potential 47 they are applied to the input of sampling circuit 49. When an increment of $E_x$ equal to the voltage of battery 50 and therefore equal to $\Delta E_x$ is developed in unit 47, comparison circuit 48 operates to trigger pulse generator 52 and produces an output pulse. At this time, storage condenser 51 is connected to the source 47 of the variable voltage $E_x$ and is charged to a voltage having the same value as $E_x$. The condenser 51 is then immediately disconnected from the source of variable voltage 47 but stores the value of $E_x$ as obtained during the time which it was connected to source 47. Since the sampling circuit 49 operates only when the comparison circuit 48 has equal voltages applied to it from the source of variable potential 47 and from the battery 50 in series with condenser 51, it will be manifest that the comparison circuit 48 will trigger pulse generator 52 whenever the voltage obtained from the source of variable potential 47 exceeds the voltage across the condenser 51 by the amount of the voltage of battery 50 or by $\Delta E_x$. Therefore, the output of the pulse generator circuit 52 will consist of one pulse whenever the value of the source of variable potential changes by an amount $\Delta E_x$.

Referring now to the arrangement of Fig. 1, the switch arm 14 is positioned in contact with element 16 and the tap on potentiometer 45 is adjusted in accordance with the relationship of $\Delta E_x$ to unity. The pulse generated in unit 13 is applied to first sweep-generator circuit 11. Thereafter, the operation of the arrangement of Fig. 1 to solve the Equation 3 is the same as that explained with respect to Equation 1 except, as previously mentioned, the positioning of the variable tap on potentiometer 45 is determined by the value of $\Delta E_x$ rather than the value of $\Delta t$ and, since the cycles of operation of the computer are determined by the equal increments in potential of $\Delta E_x$, the integration performed is one with respect to $E_x$.

*Description of computer capable of performing the operation of differentiation*

Fig. 5 is a circuit diagram, partly schematic, representing an embodiment of the invention useful for performing the mathematical operation of differentiation. Since most of the circuit arrangement of Fig. 5 is the same as that of Fig. 1, corresponding elements have the same reference numerals and similar elements have the same reference numerals primed. It is desired that equations of the following type be solved by the Fig. 5 embodiment.

$$\frac{d(E_z)}{dt} \text{ where } E_z = \int E_y dt \qquad (4)$$

or $$\frac{d(E_z)}{dx} \text{ where } E_z = \int E_y d(E_x) \qquad (5)$$

In the Fig. 5 computer, the instantaneous value of the voltage generated in unit 19' represents the value of a parameter which is the derivative of a function to be differentiated. The potentiometer 45 now represents a means for multiplying the values of the predetermined parameter established across the condenser 44 by a constant to obtain the value of a function which is the integral of the parameter obtained from source 19'. The value of the constant is determined by the period of the repeated energizations of the computer circuit.

The Fig. 5 computer also includes means for comparing the values of the function to be differentiated to the values of the integral developed in the high impedance potentiometer 45. These means comprise a third comparison circuit 53, similar in construction and manner of operation to either the first comparison circuit 20 or the second comparison circuit 35, and a source of variable voltage of the function to be differentiated 54 connected to the comparison circuit 53.

The computer represented by Fig. 5 also has means for maintaining equal the instantaneous values of the function to be differentiated obtained from the source 54 and the values of the integral developed in the potentiometer 45. This means comprises a servomechanism 55 connected between the output of the third comparison circuit 53 and the source of variable voltage 19'.

*Operation of computer capable of performing the operation of differentiation*

The operation of the embodiment represented by Fig. 5, in so far as the development of a voltage in potentiometer 45 to represent the integrated value of a variable parameter represented by the voltage obtained from the source of variable voltage 19' is concerned, is exactly the same as the operation of the embodiment of Fig. 1 described above. As therein described, a voltage is developed across the output terminals of potentiometer 45 which, at a selected time, has a value representing the value of the integral of a variable function which determines the value of the variable voltage in source 19'. Conversely, the value of the variable voltage in source 19', at a selected time, represents the value of the derivative of that integral. Therefore, if the value of the integral represented by the voltage present across the output terminals of the potentiometer 45 is made equivalent to the value of the function which is to be differentiated, then the value of the voltage appearing in source of variable voltage 19' becomes the value of the derivative of the function to be differentiated. Thus, in operation, the third comparison circuit 53 controls the servomechanism 55 so as to vary the value of the voltage developed in source 19' in such a manner that at any instant the value of the voltage present across the output terminals of potentiometer 45 equals the value of the voltage obtained from the source 54. In this way the value of the voltage in source 19' continuously represents the value of a derivative of the function to be differentiated.

It will be apparent from the above description of the invention that an electrical computer involving the invention is applicable generally to solving equations requiring the operations of integration or differentiation with respect to time or some other variable. The computer described is free of mechanical moving parts except for potentiometer and servomechanisms, is compact and of small weight, and is capable of accurate computation at high speeds. In addition, the computer according to the present invention is capable of solving integration and differentiation problems of a type that have heretofore been difficult if not impossible of solution by any electron or mechanical means.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. An electrical computer for solving equations involving a plurality of parameters, at least some of which are variable, comprising: a first generator for generating a saw-tooth wave having a value at some time equal to a value of one of said variable parameters; a first comparison circuit including an electron-discharge device jointly responsive to said one variable parameter and said saw-tooth wave for generating a pulse when a value of said one variable parameter equals a value of said first saw-tooth wave; a second saw-tooth wave generator responsive to said pulse of said first comparison circuit for generating a second saw-tooth wave having a value, at some time after said response to said pulse, equal to the value of a predetermined parameter; a storage circuit for retaining values of said predetermined parameter; a second comparison circuit coupled between said second saw-tooth wave generator and said storage circuit, jointly responsive to said second saw-tooth wave and said predetermined parameter for generating a pulse when a value of said second saw-tooth wave equals a value of said predetermined parameter; a sampling means responsive to said pulse of said second comparison circuit for sampling the value of said first saw-tooth wave at the time the value of said second saw-tooth wave represents said value of said predetermined parameter to effect the storing of a new value of said predetermined parameter in said storage circuit; and means for utilizing said stored values of said predetermined parameter.

2. An electrical computer for solving equations involving known and unknown parameters comprising: a first reference circuit having circuit elements so proportioned as, upon energization, to develop a first effect varying as a predetermined time function, said effect at an instant of time after said energization, as determined by the instantaneous value of an unknown parameter which is the derivative of a known parameter to be differentiated, reaching a value representing said unknown parameter; means for repeatedly energizing said reference circuit; a second reference circuit having circuit elements so proportioned as, upon energization controlled by said value of said first effect, to develop a second effect varying as a predetermined time function, said second effect at an instant of time after said energization as determined by a predetermined parameter reaching a value representing said predetermined parameter; means responsive, after each of said repeated energizations, to both said effects at the time the value of said second effect represents said value of said predetermined parameter for selecting another value of said first effect; means for storing said last-mentioned other value of said first effect at said last-mentioned time after each of said repeated energizations to establish a new value of said predetermined parameter; means for multiplying said stored values of said predetermined parameter by a constant determined by the period of said repeated energizations to obtain a function which is the integral of said unknown parameter; means for comparing the values of said known parameter to be differentiated and those of said integral; and means for maintaining equal the instantaneous values of said known parameter to be differentiated and those of said integral.

3. An electrical computer for solving equations involving a plurality of parameters, at least some of which are variable, comprising: a first generator to generate a saw-tooth wave having a value at some time equal to a value of one of said variable parameters; a source of variable voltage so proportioned as substantially continuously to generate a unidirectional voltage corresponding to each value of said one variable parameter; a first comparison circuit including an electron-discharge device jointly responsive to said one variable parameter and said saw-tooth wave to generate a pulse when a value of said one variable parameter equals a value of said first saw-tooth wave; a second saw-tooth wave generator triggered by said pulse of said first comparison circuit to generate a second sawtooth wave having a value, at some time after said response to said pulse, equal to the value of a predetermined parameter; a storage circuit for retaining values of said predetermined parameter; a second comparison circuit coupled between said second saw-tooth wave generator and said storage circuit, jointly responsive to said second saw-tooth wave and said predetermined parameter for generating a pulse when a value of said second saw-tooth wave equals a value of said predetermined parameter; a sampling means responsive to said pulse of said second comparison circuit for sampling the value of said first saw-tooth wave at the time the value of said second saw-tooth wave represents said value of said predetermined parameter to effect the storing of a new value of said predetermined parameter in said storage circuit; and means for utilizing said stored values of said predetermined parameter.

4. An electrical computer for solving equations involving a plurality of parameters, at least some of which are variable, comprising: a first generator to generate a saw-tooth wave having a value at some time equal to a value of one of said variable parameters; a timing-pulse generator coupled to said first generator for repeatedly energizing said first generator; a source of variable voltage so proportioned as substantially continuously to generate a unidirectional voltage corresponding to each value of said one variable parameter; a first comparison circuit including an electron-discharge device jointly responsive to said one variable parameter and said saw-tooth wave to generate a pulse when a value of said one variable parameter equals a value of said first saw-tooth wave; a second saw-tooth wave generator triggered by said pulse of said first comparison circuit to generate a second saw-tooth wave having a value, at some time after said response to said pulse, equal to the value of a predetermined parameter; a storage circuit for retaining values of said predetermined parameter; a second comparison circuit, coupled between said second saw-tooth wave generator and said storage circuit, jointly responsive to said second saw-tooth wave and said predetermined parameter for generating a pulse when a value of said second sawtooth wave equals a value of said predetermined parameter; a sampling means responsive to said pulse of said second comparison circuit for sampling the value of said first saw-tooth wave at the time the value of said second saw-tooth wave represents said value of said predetermined parameter to effect the storing of a new value of said predetermined parameter in said storage circuit; and means for utilizing said stored values of said predetermined parameter.

5. An electrical computer for solving equations involving a plurality of functions, at least some of which are variable, comprising: a first generator to generate a saw-tooth wave having a value at some time equal to a value of one of said variable functions of an equation to be solved; a timing-pulse generator coupled to said first generator for repeatedly energizing said first generator; a level-adjusting circuit coupled to said first generator and so proportioned as to maintain any selected value of said first sawtooth wave at a constant level with respect to a reference level; a source of variable voltage so proportioned as substantially continuously to generate a unidirectional voltage corresponding to each value of said one variable function of an equation to be solved; a first comparison circuit including an electron-discharge device jointly responsive to said one variable function and said saw-tooth wave to generate a pulse when a value of said one variable function equals a value of said first saw-tooth wave; a second saw-tooth wave generator triggered by said pulse of said first comparison circuit to generate a second saw-tooth wave having a value, at some time after said response to said pulse, equal to the value of the sum of previously selected values of said one variable function; a storage circuit for retaining said sum of said previously selected values of said one variable function; a second comparison circuit coupled between said second saw-tooth wave generator and said storage circuit, jointly responsive to said second saw-tooth wave and said sum for generating a pulse when a value of said second saw-tooth wave equals the value of said sum; a sampling means responsive to said pulse of said second comparison circuit for sampling the value of said first saw-tooth wave at the time the value of said second saw-tooth wave represents said value of said sum to effect the storing of a new sum in said storage circuit; and means for utilizing said values of said sum.

6. An electrical computer for solving equations involving a plurality of functions, at least some of which are variable, comprising: a first generator to generate a saw-tooth wave having a value at some time equal to a value of one of said variable functions of an equation to be solved; a timing-pulse generator coupled to said first generator for repeatedly energizing said first generator; a first level-adjusting circuit coupled to said first generator and so proportioned as to maintain any selected value of said first sawtooth wave at a constant level with respect to a reference level; a source of variable voltage so proportioned as substantially continuously to generate a unidirectional voltage corresponding to each value of said one variable function of an equation to be solved; a first comparison circuit including an electron-discharge device jointly responsive to said one variable function and said saw-tooth wave for generating a pulse when a value of said one variable function equals a value of said first saw-tooth wave; a second saw-tooth wave generator triggered by said pulse of said first comparison circuit to generate a second saw-tooth wave having the same slope as said first saw-tooth wave and having a value, at some time after said response to said pulse, equal to the value of the sum of previously selected values of said one variable function; a second leveladjusting circuit coupled to said second generator to maintain any selected value of said second saw-tooth wave at a constant level with respect to zero voltage; a storage circuit for retaining said sum of said previously selected values of said one variable function; a second comparison circuit coupled between said second leveladjusting circuit and said storage circuit, jointly responsive to said second saw-tooth wave and said sum for generating a pulse when a value of said second saw-tooth wave equals the value of said sum; a sampling means responsive to said pulse of said second comparison circuit for sampling the value of said first saw-tooth wave at the time the value of said second saw-tooth wave represents said value of said sum to effect the storing of a new sum in said storage circuit; and means for utilizing said values of said sum.

7. An electrical computer for solving equations involving a plurality of parameters at least some of which are variable comprising: a first electrical reference circuit having circuit elements with resistance and reactance values so proportioned as to develop a first electrical effect varying as a predetermined time function, a value of said effect at an instant of time representing a value of one of said variable parameters; a source of potential having a value representative of one of said parameters; means for utilizing said potential of said source and said first effect at said instant of time to develop a control effect; a second electrical reference circuit having circuit elements with resistance and reactance values so proportioned as to develop a second electrical effect varying as a predetermined time function, a value of said second effect at some time representing a value of a predetermined parameter; means responsive to said second effect at the time the value of said second effect represents said value of said predetermined parameter for selecting another value of said first effect; means for storing said last-mentioned other value of said first effect at said last-mentioned time to establish another value of said predetermined parameter; and means for utilizing said stored values of said predetermined parameter.

8. An electrical computer for solving equations involving a plurality of parameters at least some of which are variable comprising: a first electrical reference circuit having circuit elements with resistance and reactance values so proportioned as to develop a first electrical effect varying as a predetermined time function, a value of said effect at an instant of time representing a value of one of said variable parameters; a source of potential having a value representative of one of said parameters; means for utilizing said potential of said source and said first effect at said instant of time to develop a control effect; a second electrical reference circuit having circuit elements with resistance and reactance values so proportioned as to develop a second electrical effect varying as a predetermined time function, a value of said second effect at some time representing a value of a predetermined parameter; said resistance and reactance values of said circuit elements of at least one of said reference circuits being so proportioned as to cause one of said electrical effects to vary as a substantially linear function of time; means responsive to said second effect at the time the value of said second effect represents said value of said predetermined parameter for selecting another value of said first effect; means for storing said last-mentioned other value of said first effect at said last-mentioned time to establish another value of said predetermined parameter; and means for utilizing said stored values of said predetermined parameter.

9. An electrical computer for solving equations involving a plurality of parameters at least some of which are variable comprising: a first electrical reference circuit having circuit elements with resistance and reactance values so proportioned as to develop a first electrical effect varying as a predetermined time function, a value of said effect at an instant of time representing a value of one of said variable parameters; a source of potential having a value representative of one of said parameters; means for utilizing said potential of said source and said first effect at said instant of time to develop a control effect; a second electrical reference circuit having circuit elements with resistance and reactance values so proportioned as to develop a second electrical effect varying as a predetermined time function, a value of said second effect at some time representing a value of a predetermined parameter; said resistance and reactance values of said circuit elements of at least one of said reference circuits being so proportioned as to cause one of said effects to vary as a linearly increasing function of time; means responsive to said second effect at the time the value of said second effect represents said value of said predetermined parameter for selecting another value of said first effect; means for storing said last-mentioned other value of said first effect at said last-mentioned time to establish another value of said predetermined parameter; and means for utilizing said stored values of said predetermined parameter.

10. An electrical computer for solving equations involving a plurality of parameters at least some of which are variable comprising: a first sweep-signal generator circuit having circuit elements with resistance and reactance values so proportioned as to develop a first electrical effect varying as a predetermined time function, a value of said effect at an instant of time representing a value of one of said variable parameters; a source of potential having a value representative of one of said parameters; means for utilizing said potential of said source and said first effect at said instant of time to develop a control effect; a second sweep-signal generator circuit having circuit elements with resistance and reactance values so proportioned as to develop a second electrical effect varying as a predetermined time function, a value of said second effect at some time representing a value of a predetermined parameter; means responsive to said second effect at the time the value of said second effect represents said value of said predetermined parameter for selecting another value of said first effect; means for storing said last-mentioned other value of said first effect at said last-mentioned time to establish another value of said predetermined parameter; and means for utilizing said stored values of said predetermined parameter.

11. An electrical computer for solving equations involving a plurality of parameters at least some of which are variable comprising: a first electrical reference circuit having circuit elements with resistance and reactance values so proportioned as, upon energization, to develop a first electrical effect varying as a predetermined time function, a value of said effect at an instant of time after said energization representing a value of one of said variable parameters; a source of potential having a value representative of one of said parameters; means for utilizing said potential of said source and said first effect at said instant of time to develop a control effect; a second electrical reference circuit having circuit elements with resistance and reactance values so proportioned as, upon energization controlled by said control effect, to develop a second electrical effect varying as a predetermined time function, a value of said second effect at some time after said energization representing a value of a predetermined parameter; means responsive to said second effect at the time the value of said second effect represents said value of said predetermined parameter for selecting another value of said first effect; means for storing said last-mentioned other value of said first effect at said last-mentioned time to establish another value of said predetermined parameter; and means for utilizing said stored values of said predetermined parameter.

12. An electrical computer for solving equations involving a plurality of parameters at least some of which are variable comprising: a first electrical reference circuit having circuit elements with resistance and reactance values so proportioned as upon energization to develop a first electrical effect varying as a predetermined time function, said effect at an instant of time after said energization, determined by one of said variable parameters, reaching a value representing said variable parameter; means for repeatedly energizing said reference circuit; a source of potential having a value representative of one of said parameters; means for utilizing said potential of said source and said first effect at said instant of time to develop a control effect; a second electrical reference circuit having circuit elements with resistance and reactance values so proportioned as, upon energization controlled by said control effect, to develop a second electrical effect varying as a predetermined time function, said second effect at an instant of time after said energization thereof as determined by a predetermined parameter reaching a value representing said predetermined parameter; means responsive, after each of said repeated energizations, to said second effect at the time the value of said second effect represents said value of said predetermined parameter for selecting another value of said first effect; means for storing after each of said repeated energizations said last-mentioned other value of said first effect at said last-mentioned time to establish another value of said predetermined parameter; and means for utilizing said stored values of said predetermined parameter.

13. An electrical computer for solving equations involving a plurality of parameters at least some of which are variable comprising: a first saw-tooth wave generator circuit having circuit elements with resistance and reactance values so proportioned as upon energization to develop a first voltage varying as a predetermined linear time function, said voltage at an instant of time after said energization, determined by a reference voltage representing a value of one of said variable parameters, reaching a value representing said value of said one variable parameter; means for repeatedly energizing said reference circuit; a source of said reference voltage; means for utilizing said reference voltage and said first voltage at said instant of time to develop a control voltage; a second saw-tooth wave generator circuit having circuit elements with resistance and reactance values so proportioned as, upon energization controlled by said control voltage, to develop a second voltage varying as a predetermined linear time function, said second effect at an instant of time after said energization thereof as determined by another voltage representing the value of another of said variable parameters related to the equations to be solved reaching a value representing said value of said other variable parameter; means responsive, after each of said repeated energizations, to said second voltage at the time the value of said second voltage represents said value of said other variable parameter for selecting another value of said first voltage; means for storing after each of said repeated energizations said last-mentioned other value of said first voltage at said last-mentioned time to establish another value of said other variable parameter; and means for utilizing said stored values of said other variable parameter.

14. An electrical computer for solving an equation involving known and unknown parameters comprising: a first electrical reference circuit having circuit elements with resistance and reactance values so proportioned as upon energization to develop a first electrical effect varying as a predetermined time function, said effect at an instant of time after said energization, determined by the instantaneous value of a known parameter to be integrated, reaching a value representing said known parameter; means for repeatedly energizing said reference circuit; a source of potential having a value representative of said known parameter; means for utilizing said potential of said source and said first effect at said instant of time to develop a control effect; a second electrical reference circuit coupled to said first reference circuit and having circuit elements with resistance and reactance values so proportioned as, upon energization controlled by said control effect, to develop a second electrical effect varying as a predetermined time function, said second effect at an instant of time after said energization thereof as determined by a predetermined parameter established by the previous values of the parameter to be integrated reaching a value representing said predetermined parameter; means responsive, after each of said repeated energizations, to said second effect at the time the value of said second effect represents said value of said predetermined parameter for selecting another value of said first effect; means for storing after each of said repeated energizations said last-mentioned other value of said first effect at said last-mentioned time to establish another value of said predetermined parameter; and means for multiplying said stored values of said predetermined parameter by a constant determined by the period of said repeated energizations to obtain the integral of said parameter to be integrated.

15. An electrical computer for solving an equation involving known and unknown parameters comprising: a first saw-tooth wave generator circuit having circuit elements with resistance and reactance values so proportioned as upon energization to develop a first electrical effect varying as a predetermined linear time function, said effect at an instant of time after said energization, determined by an instantaneous value of a known parameter to be integrated with respect to time, reaching a value representing said known parameter; means for repeatedly energizing said reference circuit at regularly spaced time intervals; a source of potential having a value representative of one of said parameters; means for utilizing said potential of said source and said first effect at said some time to develop a control effect; a second saw-tooth wave generator circuit having circuit elements with resistance and reactance values so proportioned as, upon energization controlled by said control effect, to develop a second electrical effect varying as a predetermined linear time function, said second effect at an instant of time after said energization thereof as determined by a predetermined parameter determined by the summation of previous values of said parameter to be integrated reaching a value representing said predetermined parameter; means responsive after each of said repeated energizations, to said second effect at the time the value of said second effect represents said value of said predetermined parameter for selecting another value of said first effect; means for storing after each of said repeated energizations said last-mentioned other value of said first effect at said last-mentioned time to establish another value of said predetermined parameter; and means for multiplying said stored values of said predetermined parameter by a constant determined by the period of said repeated energizations to obtain the integral of said parameter to be integrated.

16. An electrical computer for solving an equation involving known and unknown parameters comprising: a first electrical reference circuit having circuit elements with resistance and reactance values so proportioned as upon energization to develop a first electrical effect varying as a predetermined time function, said effect at an instant of time after said energization, determined by the instantaneous value of a known parameter to be integrated, reaching a value representing said variable parameter; means for converting equal increments which correspond to one component of said equation to be integrated into increments of time related thereto; means responsive to said time increments for repeatedly energizing said reference circuit; a source of potential having a value representative of one of said parameters; means for utilizing said potential of said source and said first effect at said instant of time to develop a control effect; a second electrical reference circuit having circuit elements with resistance and reactance values so proportioned as, upon energization controlled by said control effect, to develop a second electrical effect varying as a predetermined time function, said second effect at an instant of time after said energization thereof as determined by a predetermined parameter reaching a value representing said predetermined parameter; means responsive, after each of said repeated energizations, to said second effect at the time the value of said second effect represents said value of said predetermined parameter for selecting another value of said first effect; means for storing after each of said repeated energizations said last-mentioned other value of said first effect at said last-mentioned time to establish another value of said predetermined parameter; and means for multiplying said stored values of said predetermined parameter by a constant proportional to the value of said equal increments to obtain the integral of said parameter to be integrated.

17. An electrical computer for solving equations involving known and unknown parameters at least some of which are variable comprising: a first electrical reference circuit having circuit elements with resistance and reactance values so proportioned as upon energization to develop a first electrical effect varying as a predetermined time function, said effect at an instant of time after said energization, determined by one of said variable parameters, reaching a value representing one of said unknown variable parameters; means for repeatedly energizing said reference circuit; a source of potential having a value representative of one of said parameters; means for utilizing said potential of said source and said first effect at said some time to develop a control effect; a second electrical reference circuit having circuit elements with resistance and reactance values so proportioned as, upon energization controlled by said control effect, to develop a second electrical effect varying as a predetermined time function, said second effect at an instant of time after said energization thereof as determined by a predetermined parameter reaching a value representing said predetermined parameter; means responsive, after each of said repeated energizations, to said second effect at the time the value of said second effect represents said value of said predetermined parameter for selecting another value of said first effect; means for storing after each of said repeated energizations said last-mentioned other value of said first effect at said last-mentioned time to establish another value of said predetermined parameter; means for continuously multiplying said stored values of said predetermined parameter by a constant determined by the period of said repeated energizations to obtain the integral of said one variable parameter; and means for maintaining the instantaneous values of said integral equal to those of a known parameter to be differentiated whereby said one variable parameter represents the value of the derivative of said parameter to be differentiated.

CHARLES J. HIRSCH.

References Cited in the file of this patent

UNITED STATES PATENTS

| Number | Name | Date |
|---|---|---|
| 2,313,666 | Peterson | Mar. 9, 1943 |
| 2,401,729 | Goldsmith | June 11, 1946 |
| 2,403,873 | Mumma | July 9, 1946 |
| 2,412,467 | Morton | Dec. 10, 1946 |
| 2,422,698 | Miller | June 24, 1947 |
| 2,426,910 | Wilson | Sept. 2, 1947 |
| 2,433,254 | Aiken | Dec. 23, 1947 |
| 2,594,731 | Connolly | Apr. 29, 1952 |